United States Patent [19]

Goodson

[11] Patent Number: 4,835,659

[45] Date of Patent: May 30, 1989

[54] TELEPHONE DROP BOX WITH PERMANENTLY WIRED FEEDER CABLE

[76] Inventor: Bob J. Goodson, 11807 Sunburst, Unit 101, San Antonio, Tex. 78230

[21] Appl. No.: 182,860

[22] Filed: Apr. 18, 1988

[51] Int. Cl.[4] ................ H05K 5/00

[52] U.S. Cl. ................ 361/390; 379/327; 361/426; 361/428

[58] Field of Search ................ 174/41, 59, 60; 361/390, 426, 428; 379/326-327, 437, 451-452

[56] References Cited

U.S. PATENT DOCUMENTS

| | | | |
|---|---|---|---|
| 1,862,811 | 6/1932 | Strong | 174/41 |
| 4,390,744 | 6/1983 | Suffi et al. | 174/41 |
| 4,694,118 | 9/1987 | Schmidt | 174/59 |

*Primary Examiner*—A. D. Pellinen

*Assistant Examiner*—Gregory D. Thompson

*Attorney, Agent, or Firm*—John R. Merkling

[57] ABSTRACT

A drop box for an electrical system wherein substantially all incoming lines are substantially permanently attached to terminals for removably receiving internal jumper wires and wherein connections between incoming feeder lines and associated terminals are permanently hermetically sealed.

3 Claims, 1 Drawing Sheet

TELEPHONE DROP BOX WITH PERMANENTLY WIRED FEEDER CABLE

FIELD OF INVENTION

This invention relates generally to apparatus for providing cross connections for a telephone system or the like and more particulary to a novel apparatus and method for permanently installing all wires of incoming feeder cables for selected access during use.

PRIOR ART

It has been the practice to provide telephone service to a group of residential or commercial users by introducing portions of a trunk telephone line or feeder cable into a drop box from which distribution cables are extended to residential or business users. In the prior art, only selected lines in the feeder cable have been connected to terminals in the drop box. Consequently, when demand for telephone service has risen, it has not been uncommon for all available lines to be in use. Frequently, new lines would then be run from remote locations at substantial costs. Even if unused lines were available at the drop box, a substantial amount of trial and error, including the possible disassembly of a box, might be necessary to locate the available lines.

It is also known in the art to permanently splice two feeder cables together and to surround such a permanent connection with a relatively permanent material, such as foam, which would be generally impervious to the effects of heat, cold, light or water damage.

BRIEF SUMMARY AND OBJECTS OF THE INVENTION

The present invention comprises a drop box wherein all lines in a cable are permanently attached to a terminating block. The resulting connections are permanently sealed to minimize adverse impact from heat, cold, sun, water or other corrosive influences. A plurality of distribution cables can be removably connected to binding posts within the drop box. Jumper wires are used to connect the selected wires within the feeder cable to wires in the distribution cables.

With the foregoing in mind, it is a primary object of the present invention to provide an improved telephone drop box wherein substantially all lines in a feeder cable are permanently attached to binding posts.

A further principal object of the invention is to provide a drop box wherein the lines from a feeder cable are permanently shielded from adverse environmental influences.

Another principal object of the invention is to provide a drop box with increased accessibility to feeder lines.

Another object of the present invention is to provide a drop box wherein feeder cables and distribution cables can be cross connected by a single technician without substantial rewiring or effort in identifying available feeder lines.

These and other objects and features of the present invention will be apparent from the detailed description taken with reference to the accompanying drawings.

DETAILED DESCRIPTION OF THE ILLUSTRATED EMBODIMENT

Figure 1:
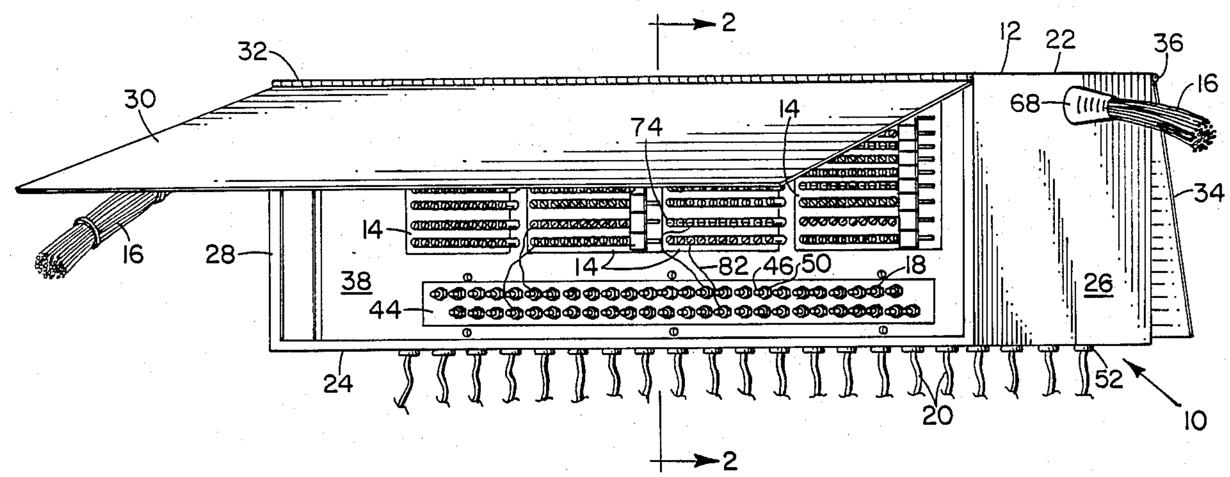
FIG. 1 is a perspective representation of a drop box according to the present invention.
Figure 2:
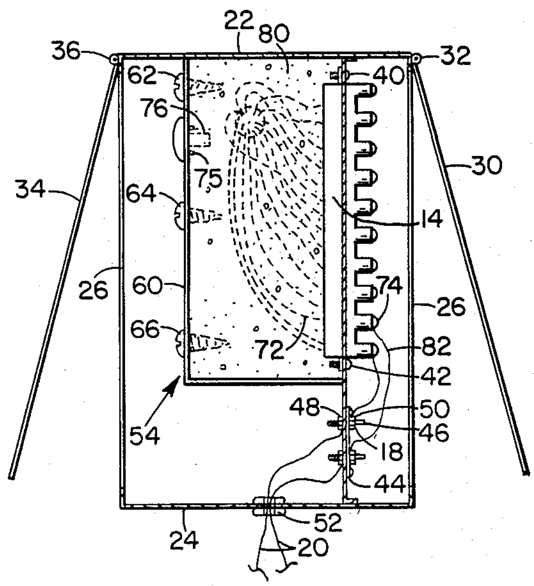
FIG. 2 is a cross sectional representation of the drop box of FIG. 1 taken along line 2—2 of FIG. 1.
Figure 3:
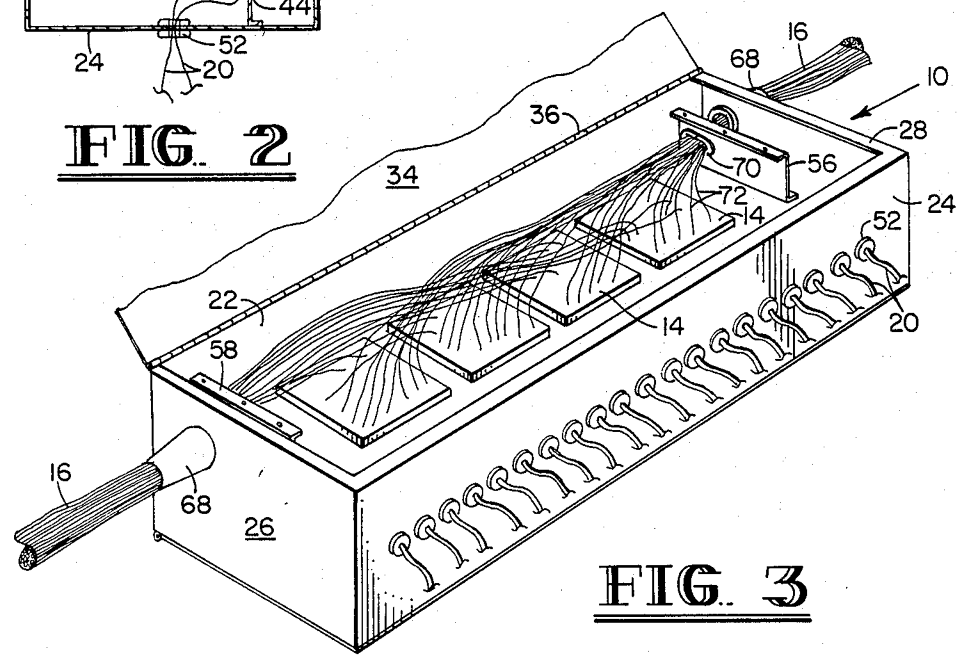
FIG. 3 is a perspective view of the interior of the drop box of FIG. 1.

Reference is now made to the drawings wherein like numerals are used to designate like parts throughout and which illustrate a presently preferred drop box, generally designated 10, in accordance with the present invention. As illustrated in FIG. 1, the drop box 10 comprises a cabinet 12 containing a plurality of termination blocks 14 to which a feeder cable 16 is connected and a plurality of binding posts 18 to which distribution cables 20 are connected.

The cabinet 12 comprises a top panel 22 and a spaced, parallel bottom panel 24. The top panel 22 and the bottom panel 24 are joined by a right end plate 26 and a left end plate 28 at opposite ends of the said upper panel 22 and lower panel 24. The right end plate 26 and the left end plate 28 are generally parallel to each other. The end plates 26, 28 and the upper and lower panels 22, 24 are connected at substantially right angles. The cabinet 12 further comprises a front cover 30 which is connected to the upper panel 22 by a hinge 32. When closed, the front lid 30 contacts edges of the lower panel 24 and of the end plates 26, 28. The cabinet 12 also has the rear cover 34 which is connected to the upper panel 22 by a hinge 36. When closed, the rear cover 34 contacts edges of the lower panel 24 and the end plates 26 and 28.

Within the cabinet 12 there is a support plate 38 which is adapted to receive a plurality of termination blocks 14. Suitable termination blocks are known in the art, such as an SS-25 termination block available from 3-M Corporation. The termination blocks 14 are affixed to the support plate 38 by suitable fasteners, such as screws 40, 42. The support plate 38 is also connected to a non-conducting strip 44. The non-conducting strip 44 is provided with a plurality of binding posts, such as binding posts 18. The binding posts 18 comprise threaded rods 46 and opposing nuts 48, 50. Distribution cables 20 are connected to one side of the binding posts 18 in a conventional manner. The distribution cables 20 pass out of the cabinet 12 through rubberized grommets such as grommet 52 in the lower panel 24 of the cabinet 12.

The cabinet 12 further comprises an interior compartment 54 which encloses a rear side of the termination blocks 14. The interior compartment 54 comprises a first end plate 56 which is permanently attached to the support plate 38 and the upper panel 22 in a conventional manner, such as by spot welding. The interior compartment 54 further comprises a second end plate 58 spaced away from and parallel to first end plate 56 and of opposite hand. Second end plate 58 is also permanently affixed to the support plate 38 and the upper panel 22 in the same manner as first end plate 56. The interior compartment 54 is completed by a cover 60 which has an "L" shaped cross section and which is affixed to the first end plate 56, and the second end plate 58 by removable fasteners, such as by screws 62, 64 and 66.

The feeder cable 16 is spliced into the box 10 through a rubberized seal 68. The feeder cable 16 is also inserted into the interior box 54 through a hole 70. Telephone cables, such as feeder cable 16, comprise a large number of individual wires such as lines 72. Each of the individual lines 72 is connected to an individual post such as post 74 on a termination block 14. In the present invention substantially all of the lines 72 are connected to posts 74 in a permanent fashion. After the lines 72 have been connected, the cover 60 is attached to the first and second end plates 56, 58, forming the interior compartment 54. The interior compartment 54 is then filed with a filler 80, such as an expandable self-hardening foam or epoxy filler available from 3-M Company through a hole 75 in the cover 60. The hole 75 is then sealed with a plug 76. The self-hardening foam 80 permanently encloses the lines 72 thereby inhibiting environmental damage (excluding abient contaminants) to the lines 72 or to the connections between the lines 72 and the termination blocks 14. Connections between the lines 72 and the distribution cables 20 are made by jumper wires, such as jumper wires 82 in a conventional manner. When the box 10 is placed in service, the feeder cable 16 is spliced into an existing telephone line network.

The invention may be embodied in other specific forms without departing from the spirit or essential characteristics thereof. The present embodiment is therefor considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Unites States Letters Patent is:

1. A drop box for a communications system comprising at least one communications cable, said at least one communications cable comprising a plurality of electrical lines, an exterior cabinet, at least one means for admitting said communications cable through a wall of said exterior cabinet, a plurality of termination block means mounted within said exterior cabinet, substantially all of said electrical lines being attached to a plurality of posts on said termination block means, and each of said attached electrical lines being in electrical communication with at least one post, an interior compartment mounted within said exterior cabinet and substantially enclosing one side of said termination block means, an inert filler contained in said interior compartment, a plurality of binding post means mounted in said exterior cabinet, each of said binding post means being adapted to removably receive an electrical connection from at least one of said post on said termination block means, means for connecting each of at least some of said binding post means to an electrical communications wire, means for admitting said electrical communications wires into said exterior cabinet, and a door on said exterior cabinet for accessing said termination block means and binding post means.

2. A drop box according to claims 1 wherein the inert filler excludes abient contaminants.

3. A drop box according to claim 2 wherein the inert filler is a self hardening foam.

* * * * *